United States Patent [19]

Schreiber

[11] Patent Number: 4,621,928

[45] Date of Patent: Nov. 11, 1986

[54] TREATMENT SYSTEM AND METHOD FOR FLUIDS CONTAINING PARTICULATE MATTER

[75] Inventor: Georg Schreiber, Cologne, Fed. Rep. of Germany

[73] Assignee: VLT Gesellschaft fur Verfahrenstechnische Entwicklung mbH, Stuttgart, Fed. Rep. of Germany

[21] Appl. No.: 714,077

[22] Filed: Mar. 20, 1985

[51] Int. Cl.[4] ............................................. B01F 15/02
[52] U.S. Cl. ................................... 366/137; 366/165; 366/171; 366/172; 366/174
[58] Field of Search ............... 366/136, 137, 159, 165, 366/167, 168, 171, 172, 173, 174, 150, 40, 138, 131, 134, 161, 160, 166, 184; 422/230, 231

[56] References Cited

U.S. PATENT DOCUMENTS

| | | | |
|---|---|---|---|
| 2,557,841 | 6/1951 | Preusser | 366/137 |
| 3,166,020 | 1/1965 | Cook | 366/137 |
| 3,794,299 | 2/1974 | Wagner | 366/165 |
| 3,846,079 | 11/1974 | Alagy | 366/136 |
| 4,325,642 | 4/1982 | Kratky et al. | 366/137 |
| 4,337,069 | 6/1982 | German | 422/230 |
| 4,534,655 | 8/1985 | King | 366/137 |

FOREIGN PATENT DOCUMENTS 3106172 3/1982 Fed. Rep. of Germany .
57-71628 4/1982 Japan .

*Primary Examiner*—Robert W. Jenkins

[57] ABSTRACT

The treatment of a fluid containing a high concentration of particulate matter is enhanced by preventing the accumulation of particulate matter which falls from solution in the lower areas of the treatment vessel. The foregoing is accomplished by withdrawing fluid having a relatively low concentration of particulate matter at the axis of the vessel and subsequently reinjecting the withdrawn fluid as a jet or jets directed downwardly and tangentially to the wall of the vessel in the vicinity of the bottom thereof.

10 Claims, 8 Drawing Figures

TREATMENT SYSTEM AND METHOD FOR FLUIDS CONTAINING PARTICULATE MATTER

BACKGROUND OF THE INVENTION (1) Field of the Invention

The present invention relates to the treatment of fluids containing suspended particulate matter and particularly to improvements in mixing, thickening and similar processes performed on such fluids. More specifically, this invention is directed to improved mixers, thickeners and similar devices and especially to apparatus for preventing clogging and leaking and minimizing abrasion damage of devices which receive streams of liquid containing suspended particulate matter. Accordingly, the general objects of the present invention are to provide novel and improved methods and apparatus of such character.

(2) Description of the Prior Art

The present invention is particularly well-suited for use in the mixing, thickening and the like of fluids which contain particulate matter. The operation of mixers, thickeners, columns and similar equipment is frequently accompanied by undesirable occurrences such as clogging and leaking and by erosion as a result of the abrasion action of the particulate material. These undesirable occurrences become more pronounced when it is desired to extract a fluid having higher than a normal or average particle concentration from the apparatus.

As an example, if the discharge from a mixer, thickener or similar device is required to have a higher particle concentration than the average level present within the device itself, a sedimentation process must occur within the device. However, that sedimentation process must be controlled in such a manner that deposits of particulate matter do not collect at the bottom of the vessel comprising the device and clog the discharge or outlet for the fluid having the high particle concentration. Because of the problems associated with such clogging, the prior art has resorted to the use of concentrating devices wherein the contents of the vessel were fluidized. Such concentrating devices may operate by means of gravitational sedimentation, by means of centrifugal force in a centrifuge or hydrocyclone, or through the use of appropriate filtration equipment.

Thickeners without agitators, and having a spillway for the excess or clarified fluid, are known in the art. Such thickeners are characterized by a simple hollow-cone discharge or outlet at the base of their vessels and must be carefully designed to match the environment of use so that a marginal concentration of particulate matter in the spillway flow is not exceeded and excessive deviations in concentration within the vessel are avoided.

In the case of prior art mixers or thickeners which include agitators, the degree of concentration of the particulate containing fluid which may be obtained is severely limited because the cross-section of the base of the vessel comprising the mixer or thickener becomes smaller in the direction of flow. Accordingly, there is the danger that the capacity of the discharge or outlet system of the mixer or thickener will be insufficient or that clogging in the base region will occur. In either case the particle concentration within the container may increase above the desired concentration. Accordingly, it has been common practice in the prior art to provide mixers and thickeners with movable mechanical elements to prevents clogging or the like. Such mechanical clogging prevention means may take the form of a screw-type conveyor located in the conical base portion or at the base of the discharge or outlet of the vessel of the mixer or thickener.

The above-briefly discussed problems associated with clogging and the like in mixers and thickeners have also been addressed by retro-fitting existing equipment with concentrators of the types briefly discussed above, namely centrifuges, hydrocyclones and filters with associated pumps. In the case of such retro-fitting, the fluid containing the particulate matter is fed by the pump to the centrifuge, hydrocyclone or filter which is physically located outside of or external to the mixer, thickener, column or similar device. Separation of the fluid into a particle enriched phase and a filtrate will occur in the concentrator and at least a part of the filtrate is re-introduced as a reverse flow in the concentrator.

It is to be noted that it has been proposed to solve some of the above-discussed problems by creating a turbulent flow around the longitudinal axis of the vessel of a mixer within a conical base section thereof. On this point reference may be had to published Japanese Application No. J 5 7071-628.

SUMMARY OF THE INVENTION

The present invention overcomes the above-briefly discussed and other deficiencies and disadvantages of the prior art by providing a novel technique for reducing the possibility of clogging in a container of a thickener, mixer or similar device and in the drainage systems for such devices. The technique of the present invention does not require utilization of mechanically movable parts, such as screw-type conveyors and the like which are immersed in the fluid suspension or slurry.

The present invention also encompasses apparatus for carrying out the above-discussed novel method, and particularly to novel anti-clogging apparatus for incorporation in a mixer, thickener or similar device. Apparatus embodying the present invention comprises a container having a cylindrical section, positioned such that its axis is vertically orientated, and a coaxial funnel or cone-shaped base section which is connected to the lower open end of the cylindrical section. The apparatus also includes a fluid supply conduit and a discharge or outlet system. Apparatus in accordance with the present invention is further characterized by an immersion tube, positioned axially of the container, which provides communication between the interior of the cone-shaped base section and a lateral discharge conduit. A pump draws fluid through the axial immersion tube and lateral conduit and the drawn-off fluid is re-introduced at an angle relative to the axis of the container in the cone-shaped base portion. The reintroduction of the fluid is approximately at the level of the inlet, i.e., the suction, end of the axially positioned immersion tube or above this level.

BRIEF DESCRIPTION OF THE DRAWING

The present invention may be better understood and its numerous objects and advantages will become apparent to those skilled in the art by reference to the accompanying drawing wherein like reference numerals refer to like elements in the several FIGURES and in which.

DESCRIPTION OF THE DISCLOSED EMBODIMENTS

Figure 1:
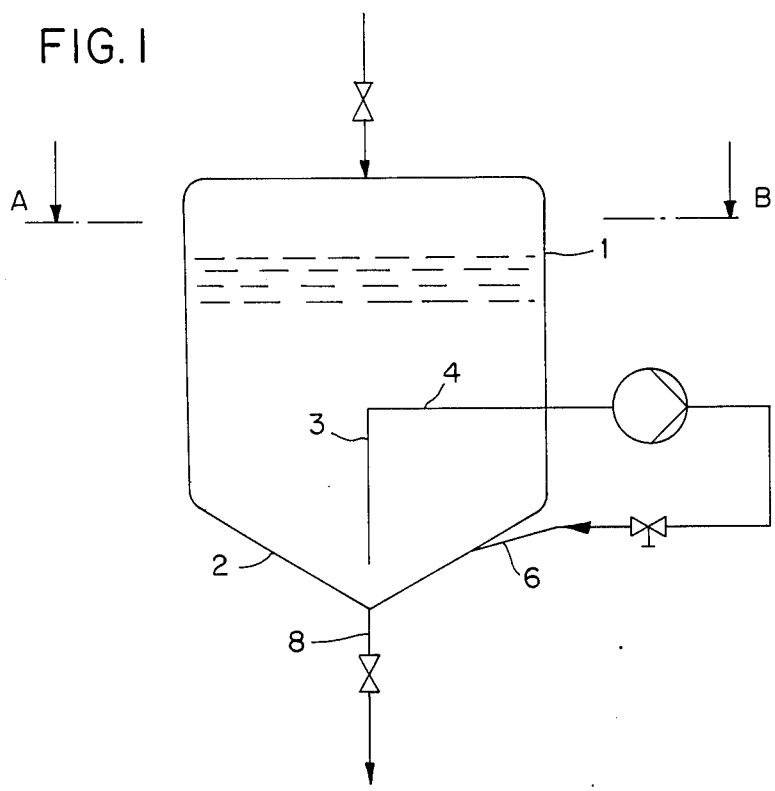
FIG. 1 is a schematic representation of apparatus in accordance with a first embodiment of the invention, FIG. 1 depicting the invention as incorporated in a mixer, thickener or similar device.
Figure 2:
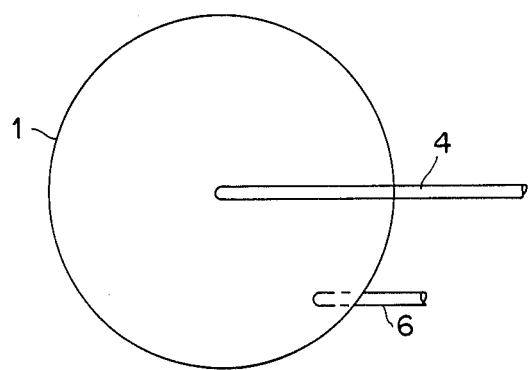
FIG. 2 is a schematic cross-sectional plan view taken along line A-B of FIG. 1.

With reference now to the drawing, and particularly FIGS. 1 and 2, the present invention may be used in or with devices for treating liquids which contain suspended particulate matter. Such devices may, for example, include mixers and thickeners. The stream of particulate laden liquid is delivered to a container which, as shown in FIG. 1, has an upper cylindrical section 1 and a funnel or cone-shaped base section 2 which is coaxial with the cylindrical section 1. These sections 1 and 2 of the container will be joined by means of welding, a flanged joint, or any other suitable joining technique. An axial immersion tube 3 is positioned so as to be coaxial with the container and to have its lower inlet end positioned within the base section 2. The upper end of immersion tube 3 is connected to a lateral outlet circuit 4, conduit 4 being horizontally orientated in the embodiment of FIGS. 1 and 2 and extending through the wall of the cylindrical section 1 of the container. Fluid pumped out of the container via immersion tube 3 and conduit 4 is returned thereto by means of a supply conduit 6. Supply conduit 6, as may be seen by joint consideration of FIGS. 1 and 2, discharges a fluid jet into the base section 2 of the container at a downwardly directed angle and generally tangentially with respect to the wall of the base section 2 of the container.

As shown in FIGS. 3-6, the upper section 1 of the container may be coupled to the funnel of cone-shaped base section 2 by means of a open-ended cylindrical intermediate section which has a reduced diameter relative to the upper section 1. In such case, the fluid jet discharged from conduit 6 will be introduced in the intermediate cylindrical section. In either case, the funnel or cone-shaped base section 2 will terminate at a discharge or outlet pipe 8 which is provided with a flow control valve.

When the apparatus depicted schematically in FIGS. 1 and 2 is in use, the concentration of the particulate matter in the liquid within the container and the rate of drainage may be controlled within very broad limits. Most importantly, the possibility of the deposition of particulate matter on the base of the container is substantially reduced. The energy required for maintaining a non-sedimented state within the base section 2 of the container is supplied by the pump which withdraws fluid from the container via immersion tube 3 and conduit 4 and returns the withdrawn fluid thereto via the conduit or conduits 6. However, it is to be understood that it is within the scope of the invention to employ other means to establish the fluid jet which is introduced tangentally and at a downward angle within the container. For example, the fluid which is employed to create this jet may be supplied from an external source.

The fluid jet introduced into the container via at least one supply conduit 6 exhibits both a tangential and an axial component. Accordingly, there will be turbulent flow about the vertical axis of the container in the base section 2. This turbulent flow will be characterized by a region of minimum velocity in the vicinity of the axis. Thus, the flow which swirls about the vertical axis of the container will produce a centrifugal force which separates particulate matter, i.e., the density of the fluid will increase in the direction of the wall of the base section 2. Accordingly, the fluid withdrawn via the immersion tube 3 will be largely free of particulate matter and thus wear of the pump will be minimized.

The fluid is discharged upwardly via the immersion tube 3 and then out of the base section 2 via the lateral outlet conduit 4. The intake opening of immersion tube 3 is located at the bottom of the immersion tube.

Figure 5:
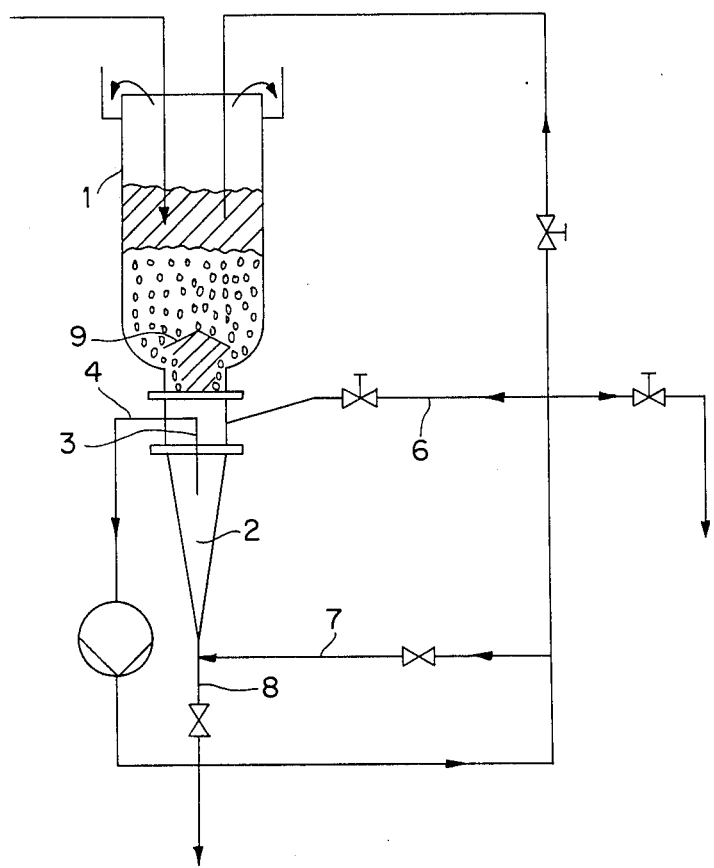
FIG. 5 is a schematic illustration of yet another embodiment of the present invention, FIG. 5 depicting the invention employed in a mixer or thickener of the non-agitated type.

In a further variant on the above-described embodiments, it may be desirable to implement an additional technique to prevent clogging that might occur at the base of the container when the mixing device, thickening device, column, reactor or the like is used to treat fluids containing particles, or used for chemical reactions. This variant consists of connecting an auxiliary conduit 7, as shown in FIG. 5, to the discharge of the pump. When the valve in conduit 7 is in the open state, fluid withdrawn via immersion tube 3 and conduit 4 will be re-injected at the bottom of the base section 2 and will effectively perform a rinsing action at the entrance to the discharge or outlet.

Figure 4:
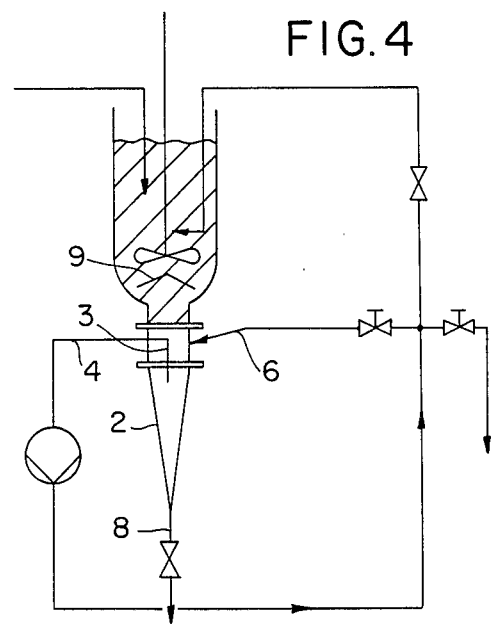
FIG. 4 is a schematic illustration of a further embodiment of the present invention, FIG. 4 consisting of a modification of the embodiment of FIG. 3.
Figure 6:
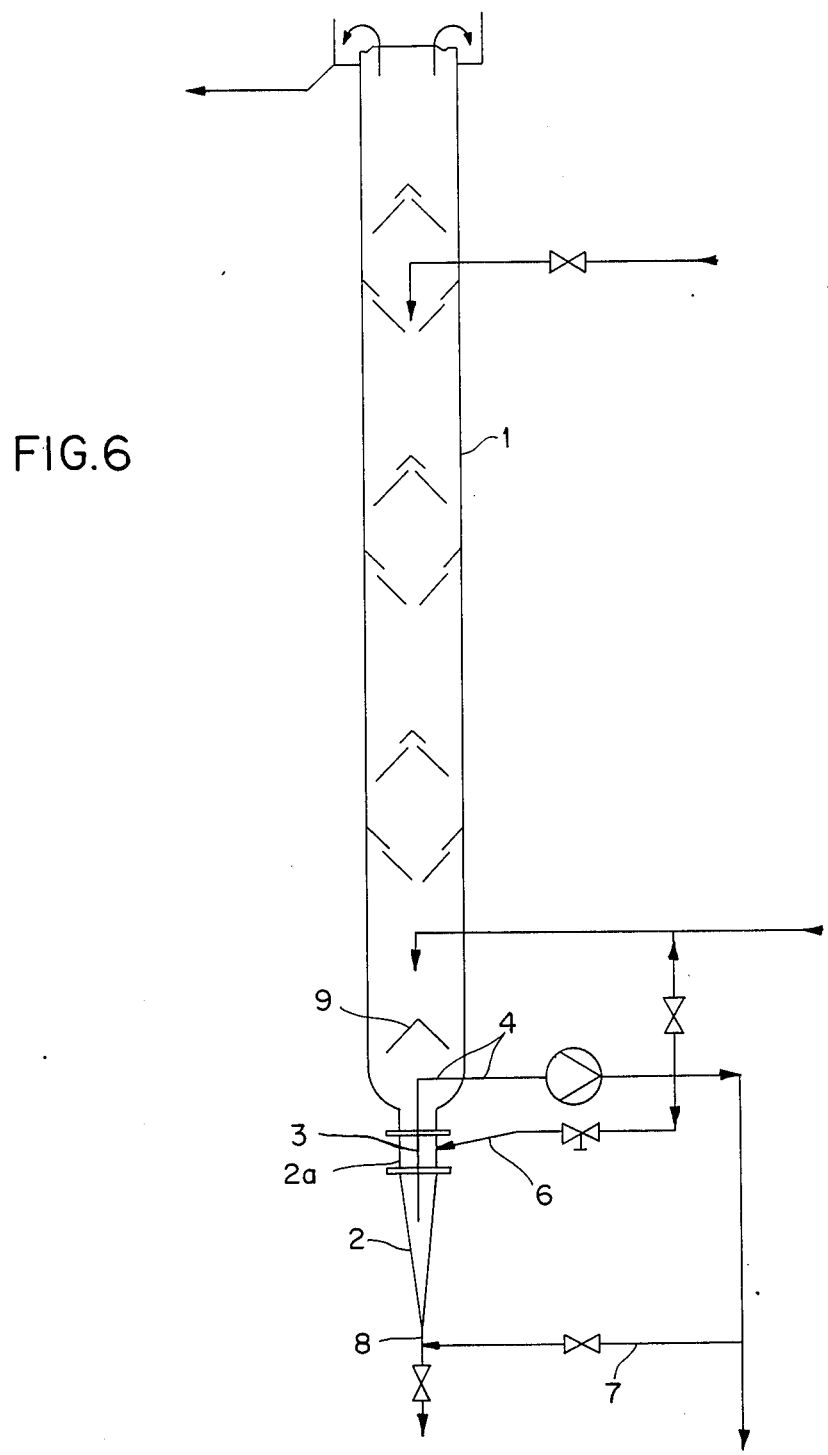
FIG. 6 is a schematic illustration of yet another embodiment of the present invention, FIG. 6 depicting the invention as incorporate in a material exchange columm.

It may, in some applications, be advantageous to insert a deflection element 9 in the container in proximity to the immersion tube 3. In the embodiments of FIGS. 4-6 the deflection element has the shape of a shallow, hollow-cone with its concave side facing downwardly. The deflection element in the embodiments of FIGS. 4-6 is located above immersion tube 3. In the design of the deflection element 9 it is important to leave an annular slot about the periphery thereof so that fluid may flow downwardly in the container. As alternatives, the deflection element 9 may have a flat, circular base which is positioned horizontally or at an angle and/or the deflection element 9 can be provided with a central opening to be otherwise perforated.

In the disclosed embodiment of the invention a current is created in the liquid within the container by the axial component of the jet discharged from conduit 6. This current establishes a flow to the bottom of the container from which it is deflected to flow upwardly around the immersion tube 3. The current contains few particles owing to its rotation around the vertical axis of the container. It is advantageous to deflect the upwardly flowing current back down again to thereby further reduce the particle concentration in the base section 2 of the container to thereby further decrease the possibility of particulate matter beind deposited on the bottom of the container. This downward deflection will be produced by the concave curvature, in the direction of upward current flow, of the deflection element 9. In summary, the fluid jet or jets which are injected into the container are low in particulate matter, as described above, and create a current which flows around immersion tube 3 in such a manner so as to reduce the concentration of particulate matter at the inlet end of immersion tube 3. This current has its greatest velocity at the bottom of the base section 2 and thus the possibility of deposition of particulate matter at the entrance to the discharge or outlet is significantly reduced.

Figure 3:
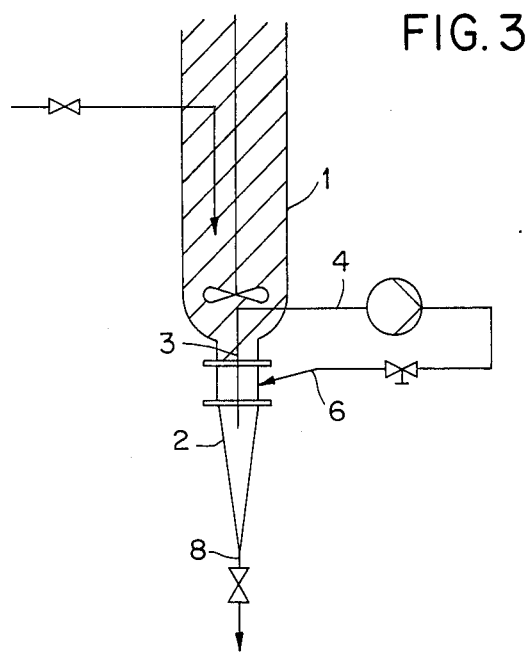
FIG. 3 is a schematic representation of the present invention as incorporated in a mixer, thickener or similar device which includes an agitator.

FIG. 3 depicts the present invention as it may be used with a mixer, thickener or similar device which is provided with an agitator. FIG. 4 shows the present invention in the environment of a device having an agitator but modified to further include the deflector element 9. The embodiment of FIG. 4 is also provided with additional conduits which may be employed either to return the fluid withdrawn via immersion tube 3 to the cylindrical upper section 1 of the container and/or to deliver such withdrawn fluid, which will be low in particulate matter, to some appropriate downstream apparatus.

In the apparatus shown in FIG. 5 the mechanical agitator is not employed and a spillway for the clarified liquid is located about the top of the container. In addition to the two additional conduits discussed above in the description of FIG. 4, the embodiment of FIG. 5 includes above-mentioned conduit 7 for use in the delivery of fluid to rinse the discharge or outlet.

FIG. 6 depicts the present invention in the environment of an exchange column. In the embodiment of FIG. 6 an additional conduit with flow control valve is provided between the discharge side of the withdrawal pump and the column 1. The embodiment of FIG. 6 is otherwise as described above. In FIG. 6 the intermediate cylindrical section of the container, i.e., the section into which the fluid jets discharged from conduit or conduits 6 are tangentially injected, as indicated in 2a.

Figure 7:
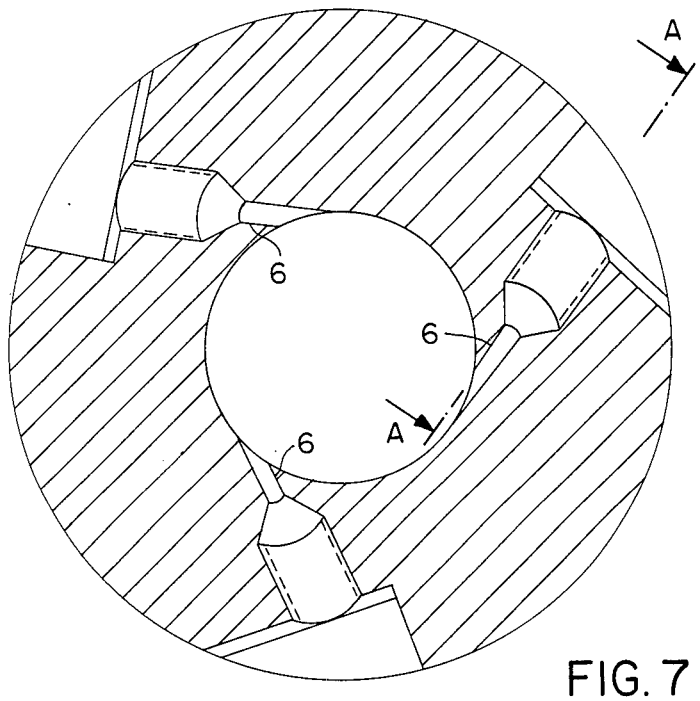
FIG. 7 is a cross-sectional plan view depicting the incorporation of the present invention in the formal-shaped base portion of the vessel of a mixer or thickener.
Figure 8:
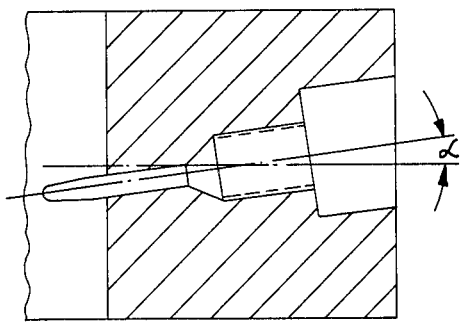
FIG. 8 is a cross-sectional view taken along line A—A of FIG. 7.

FIG. 7 is a cross-sectional view which shows the manner in which three (3) jets comprised of fluid withdrawn via immersion tube 3 may be injected into the container. In FIG. 7 the discharge ends of each of the three (3) supply conduits, or branches of a single supply conduit, have been indicated at 6. By comparing FIGS. 7 and 8 it may be seen that the jets which are re-introduced into the container are both tangential to the wall thereof and angled downwardly at an angle α which is between 5°–60° and preferably in the range of 10° to 30°.

While preferred embodiments have been shown and described, various modifications and substitutions may be made thereto without departing from the spirit and scope of the invention. Accordingly, it is understood that the present invention has been described by way of illustration and not limitation.

What is claimed is:

1. Apparatus for use in the treatment of liquids containing entrained particulate matter, said apparatus comprising vessel means, said vessel means including a vertical cylindrical section and an axially aligned converging base section coupled to the lower end of the cylindrical section, a fluid supply conduit, an outlet for liquid having a high concentration of suspended particulate matter, a conduit for the discharge of liquid having a concentration of suspended particulate matter less than that discharged through said outlet from the vessel means, at least one conduit for the tangential reintroduction of liquid withdrawn from the vessel means, an axial immersion tube with an intake opening, said immersion tube being connected to said discharge conduit whereby liquid will be withdrawn from the region of the axis of said vessel means, and pump means for delivering the withdrawn liquid to said reintroduction conduit for reintroduction into the vessel means tangentially and at an angle relative to the axis thereof and at a position not lower than the intake opening of said immersion tube.

2. The apparatus of claim 1 wherein the intake opening of the immersion tube is located at the lower end of the immersion tube and the discharge conduit extends from the upper end of the immersion tube.

3. The apparatus of claim 1 wherein the discharge conduit is connected via the pump and an auxiliary conduit to the said outlet.

4. The apparatus of claim 1 further comprising at least a first deflection element positioned in the vicinity of the immersion tube, said deflection element defining an annular passageway between the deflection element and the wall of the vessel to permit fluid to pass through.

5. The apparatus of claim 4 wherein the deflection element possesses at least a first perforation.

6. The apparatus of claim 4 wherein the withdrawn fluid is re-introduced at an angle in the range of 10° to 30° relative to a line perpendicular to the axis of the vessel means.

7. The apparatus of claim 4 wherein said deflection element has a generally concave configuration on the side which faces downwardly.

8. The apparatus of claim 7 wherein the withdrawn fluid is re-introduced at an angle in the range of 10° to 30° relative to a line perpendicular to the axis of the vessel means.

9. The apparatus of claim 1 wherein the withdrawn fluid is re-introduced at an angle in the range of 5° to 60° relative to a line perpendicular to the axis of the vessel means.

10. The apparatus of claim 1 wherein the withdrawn fluid is re-introduced at an angle in the range of 10° to 30° relative to a line perpendicular to the axis of the vessel means.

* * * * *